US012038284B2

(12) United States Patent
Araújo et al.

(10) Patent No.: US 12,038,284 B2
(45) Date of Patent: Jul. 16, 2024

(54) METHOD OF CONTROLLING A CAMERA (71) Applicant: Telefonaktiebolaget LM Ericsson (publ), Stockholm (SE)

(72) Inventors: José Araújo, Stockholm (SE); Ioannis Karagiannis, Kalamata (GR); Lars Andersson, Solna (SE); Amirhossein Taher Kouhestani, Solna (SE); Ananya Muddukrishna, Enskededalen (SE); Diego Gonzalez Morin, Galapagar (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 300 days.

(21) Appl. No.: 17/604,196

(22) PCT Filed: Apr. 18, 2019

(86) PCT No.: PCT/EP2019/060117
§ 371 (c)(1),
(2) Date: Oct. 15, 2021

(87) PCT Pub. No.: WO2020/211945
PCT Pub. Date: Oct. 22, 2020

(65) Prior Publication Data
US 2022/0232169 A1 Jul. 21, 2022

(51) Int. Cl.
*G01C 21/00* (2006.01)
*G06T 5/73* (2024.01)
(Continued)

(52) U.S. Cl.
CPC .............. *G01C 21/005* (2013.01); *G06T 5/73* (2024.01); *G06T 7/73* (2017.01); *G06V 10/10* (2022.01);
(Continued)

(58) Field of Classification Search
CPC ......... G01C 21/005; G06T 5/003; G06T 7/73; G06T 2207/10016; G06T 2207/30244;
(Continued)

(56) References Cited

U.S. PATENT DOCUMENTS

| 11,567,504 | B1* | 1/2023 | Bai | ......................... H04W 4/40 |
| 11,694,344 | B2* | 7/2023 | Joshi | .................... C12N 5/0604 382/128 |
| 2014/0125700 | A1* | 5/2014 | Ramachandran | ...... G09G 5/377 345/633 |
| 2018/0046187 | A1* | 2/2018 | Martirosyan | ........... G06T 7/292 |

(Continued)

FOREIGN PATENT DOCUMENTS

WO  WO 2018/100239 A1  6/2018

OTHER PUBLICATIONS

International Search Report and Written Opinion of the International Searching Authority, PCT/EP2019/060117, mailed Jan. 8, 2020, 11 pages.
Chakravarthula, P., et al., "FocusAR: Auto-focus Augmented Reality Eyeglasses for both Real World and Virtual Imagery," IEEE Transactions on Visualization and Computer Graphics, vol. 24, No. 11, Nov. 2018, pp. 2906-2916.
(Continued)

*Primary Examiner* — Padma Haliyur
(74) *Attorney, Agent, or Firm* — Sage Patent Group (57) ABSTRACT

A method of controlling a portable device including a camera, the method including: performing localization of the portable device using a localization algorithm having as an input image data representing images captured by the camera; identifying a current focus area of the camera; determining a desired focus area for the camera; determining that a change of focus is required when the desired focus area is different to the current focus area; and generating a control signal configured to cause the focus of the camera to change in respect of a new focus area.

15 Claims, 6 Drawing Sheets (51) Int. Cl.
  *G06T 7/73*   (2017.01)
  *G06V 10/10*  (2022.01)
  *G06V 20/10*  (2022.01)
  *H04N 23/63*  (2023.01)
  *H04N 23/67*  (2023.01)

(52) U.S. Cl.
  CPC ........... *G06V 20/10* (2022.01); *H04N 23/632* (2023.01); *H04N 23/675* (2023.01)

(58) Field of Classification Search
  CPC ......... G06T 7/246; G06T 7/579; G06V 10/10; G06V 20/10; H04N 23/632; H04N 23/675
  See application file for complete search history.

(56) References Cited

U.S. PATENT DOCUMENTS

| | | | |
|---|---|---|---|
| 2018/0061072 A1* | 3/2018 | Benezra | ............. G06T 7/70 |
| 2021/0225025 A1* | 7/2021 | Su | ............. G06T 7/246 |

OTHER PUBLICATIONS

Abdulf, "How does autofocus work on your smartphone," Tech News, Aug. 16, 2019, Copyright © 2019 giffgaff, 12 pages.

Lee, H.S., et al., "Simultaneous Localization, Mapping and Deblurring," 2011 IEEE International Conference on Computer Vision, 978-1-4577-1102-2/11, © 2011 IEEE, pp. 1203-1210.

Zhang, G., et al., "Good Features to Track for Visual SLAM," 2015 IEEE Conference on Computer Vision and Pattern Recognition (CVPR) Jun. 7-12, 2015, pp. 1373-1382.

* cited by examiner

METHOD OF CONTROLLING A CAMERA

CROSS REFERENCE TO RELATED APPLICATIONS

This application is a 35 U.S.C. § 371 national stage application of PCT International Application No. PCT/EP2019/060117 filed on Apr. 18, 2019, the disclosure and content of which is incorporated by reference herein in its entirety.

TECHNICAL FIELD

The invention relates to a method of controlling a portable device. The invention further relates to a portable device and to a system comprising a server and a portable device.

BACKGROUND

Mixed Reality, MR, augmented reality, AR, and Virtual Reality, VR are ground-breaking technologies whose popularity is increasing considerably. The first MR/AR/VR devices were very expensive and not intended for a commercial use (for example, Hololens by Microsoft or the first Oculus Rift). However, the number of new start-ups or big companies developing new MR applications or selling affordable mounted head displays (for example, Holokit) for smartphones is raising rapidly. Furthermore, the newest smartphones are being produced with embedded hardware artificial intelligence, AI, capabilities to enhance the AR experiences.

One of the common features of the MR/AR/VR devices is the application of Simultaneous Localization and Mapping, SLAM, algorithms. A SLAM algorithm enables the position and orientation of the device in the real 3D space to be estimated by tracking features extracted from sensor data available to the device. The SLAM algorithm may also generate a map of the device's surroundings, including for example a representation of the extracted features at their relative positions. In standalone MR/AR/VR headsets, multiple cameras and depth/range sensors are used, which allow robust SLAM to be performed. However, current smartphone-based MR/AR/VR applications typically rely only upon a rear camera and an Inertial Measurement Unit, IMU, to provide input to the SLAM algorithm. The precision of position tracking and mapping can decrease when either the environmental conditions or the camera settings are not optimal, for example when used in low levels of lightning, when the camera is not optimally focused, or when the camera is experiencing fast movements. This can affect the MR/AR/VR user experience considerably, in particular when virtual content is intended to be anchored to the features detected by the SLAM algorithm and the reduced SLAM performance causes virtual content erroneously to move relative to the real world.

The way that SLAM systems utilize information from a received image defines them as either direct or indirect SLAM. Indirect SLAM systems attempt to extract features first, and then make use of those features to locate the camera and build a map. In the case of an indirect SLAM algorithm, features can be simple geometric features such as corners or edges, or more sophisticated feature descriptors, for example SIFT, ORB, or FAST. An indirect, visual-inertial SLAM method is described in Meixiang Quan et al, "Accurate Monocular Visual-inertial SLAM using a Map-assisted EKF Approach", arXiv:1706.03648, 2017. Ra'ul Mur-Artal et al "ORB-SLAM: a Versatile and Accurate Monocular SLAM System", IEEE Transactions on Robotics, Volume 31, Issue 5, October 2015 illustrates ORB SLAM, which is a widely used visual indirect SLAM algorithm, which relies on the detection and tracking of ORB features.

Direct methods identify features comprising, for example, visual patterns and structures defined simply by differences in pixel intensity within a region of an image captured by a camera. Direct methods try to recover the depth and structure of the environment and the camera pose by performing an optimisation on the map and camera parameters together. As the indirect feature extraction procedure can take more time than direct feature extraction, direct methods potentially allow more time for other computations while maintaining the same frame rate as indirect methods. On the other hand, indirect feature-based methods provide better tolerance towards changing lighting conditions since, unlike direct methods, they are not using the pixel intensities directly. Recently, there have been proposals of a hybrid SLAM merging ideas from direct and indirect SLAM, as for example the SVO SLAM.

SUMMARY

It is an object to provide an improved method of controlling a portable device. It is a further object to provide an improved portable device and to provide an improved system comprising a portable device and a server.

An aspect of the invention provides a method of controlling a portable device comprising a camera. The method comprises the following. Performing localization of the portable device using a localization algorithm having as an input image data representing images captured by the camera. Identifying a current focus area of the camera. Determining a desired focus area for the camera. Determining that a change of focus is required when the desired focus area is different to the current focus area. Generating a control signal configured to cause the focus of the camera to change in respect of a new focus area.

The method enables an accurate and robust operation of a localisation algorithm when the focus area of the camera needs to be changed.

In an embodiment, performing localization of the portable device includes identifying features from the image data, determining respective position information for the identified features, and associating an uncertainty with the identification of each said feature and its determined position information indicative of a respective level of trust. The method may therefore be used with in-direct localisation algorithms, such as in-direct SLAM.

In an embodiment, the method further comprises adjusting the uncertainty associated with the identification of a feature and its determined position information as used by the localization algorithm to perform said localization of the portable device. This may ensure an accurate and robust performance of the localisation algorithm while enabling the change of focus to take place.

In an embodiment, adjusting the uncertainty comprises: increasing the uncertainty associated with features lying, or predicted to lie, outside the new focus area; changing the focus of the camera to the new focus area; and reducing the uncertainty of features lying, or predicted to lie, inside the new focus area after the change of focus of the camera is completed. This may ensure an accurate and robust performance of the localisation algorithm while a change of focus takes place.

In an embodiment, the method comprises: determining the number of features within the desired focus area having at least a minimum level of quality; and selecting the desired focus area as the new focus area when the number of features within the desired focus area having at least the minimum level of quality is at least a specified minimum number of features. By controlling the focus area, the method can ensure that a sufficient number of (high quality) features lay inside the new focus area. This way, the accuracy and robustness of the localisation algorithm is maintained.

In an embodiment, the portable device comprises an inertial measurement unit, IMU, and the localization algorithm additionally has IMU measurements as an input, and wherein adjusting the uncertainty associated with the identification of a feature and its determined position information comprises increasing the uncertainty at least to a value at which the localization algorithm preferentially uses the IMU measurements in said localization of the portable device, the uncertainty being at the increased value while the focus of the camera is changed. The uncertainty is at the increased value while the focus of the camera is changed. This makes the localisation algorithm rely more on the IMU measurements when a change of focus is to take place; blurry images captured by the camera during the change of focus will therefore be given less weight by the localisation algorithm, which will help maintain the accuracy and robustness of the localisation algorithm during the change of focus.

In an embodiment, adjusting the uncertainty associated with the identification of a feature and its determined position comprises increasing the uncertainty to a value indicative of a lack of trust while the focus of the camera is changed, causing the localization algorithm to stop running while the focus of the camera is changed. This ensures that the localisation algorithm ignores blurry images captured by the camera during the change of focus, which will result in the location and pose of the device remaining fixed during change of focus.

In an embodiment, the method further comprises determining the number of features within the desired focus area having at least a minimum level of quality. The method further comprises selecting as the new focus area an area different to the desired focus area when the number of features within the desired focus area having at least the minimum level of quality is less than a specified minimum number of features. The new focus area is an area closest to the desired focus area for which the number of features within said area having at least the minimum level of quality is at least a specified minimum number of features. This enables a trade-off to be made between the best focus area from the user experience point of view, and the area which allows the localisation algorithm to perform in an accurate and robust manner.

In an embodiment, the new focus area is one of: a larger area that includes the desired focus area; and an area of the same size as the desired focus area that is shifted from the desired focus area by a smallest distance required for the number of features having at least the minimum level of quality within said area to be at least the specified minimum number of features. This enables a trade-off to be made between the best focus area from the user experience point of view, and the area which allows the localisation algorithm to perform in an accurate and robust manner.

In an embodiment, the new focus area is shifted horizontally or vertically from the desired focus area.

In an embodiment, when the desired focus area is at a distance from the current focus area, the new focus area is a larger area that includes the desired focus area and at least part of the current focus area. The steps of changing the focus of the camera and selecting a new focus area are repeated until the new focus area converges with an area as close as possible to the desired focus area. This may enable the method to converge on the desired focus area even when it is far away from the current focus area and there are few features near the desired focus area, while all the high-quality features are near the current focus area.

In an embodiment, changing the focus of the camera and selecting a new focus area are repeated until the new focus area converges with an area as close as possible to the desired focus area.

In an embodiment, the method further comprises determining the number of features within the new focus area having at least a minimum level of quality. The method further comprises applying a deblurring algorithm to the image data before identifying features from the image data when the number of features within the new focus area having at least a minimum level of quality is at least a specified minimum number of features. In this way an efficient application of deblurring algorithms may be performed to provide images with a clear focus area to the localisation algorithm and hence allow the localisation algorithm to perform in an accurate and robust manner.

In an embodiment, a deblurring algorithm is applied if the portable device is stationary. The parameters of the deblurring algorithms used during the duration of the focus change can therefore be kept constant, so deblurring parameters only need to be computed once, which is very efficient.

In an embodiment, if a time required for the camera to change focus in respect of a new focus area is less than a threshold time period, adjusting the uncertainty associated with the identification of a feature and its determined position information comprises reducing the uncertainty associated with features lying, or predicted to lie, within the new focus area.

In an embodiment, if the change of focus can be performed instantaneously by the camera, adapting the uncertainty of the location information comprises reducing the uncertainty of the location information for features lying within the new focus area. Instantaneously means that the change of focus occurs faster than the frame rate at which the camera captures images.

In an embodiment, if the portable device is determined not to be stationary the method comprises delaying a change of focus of the camera to the new focus area until the portable device is determined to be stationary. If the device is stationary, the best possible performance is achieved for the localisation algorithm.

In an embodiment, the desired focus area is at least one of: an area centred on a position within an image displayed on a display of the portable device on which a user's eyes are focused; an area centred on a position within an image displayed on a display of the portable device on which a user has made a tap gesture; an area defined by a position and dimensions of virtual content displayed on a display of the portable device with the images captured by the camera; an area defined by a position and dimensions of a fiducial marker applied to the camera measurements; and a specified region of interest. The need for a change of focus can therefore be triggered as a result of a desired focus area being selected or identified in a number of different ways.

In an embodiment, the localisation algorithm is one of a localisation and mapping algorithm and a structure from motion algorithm. The method is thus applicable to the problem of building a 3D model of the environment and localizing the portable device within the environment.

In an embodiment, the localisation algorithm is a simultaneous localisation and mapping, SLAM, algorithm.

In an embodiment, the portable device is one of a computing device, a smart phone, a portable phone, a cell phone, a wireless device, a wireless camera, a gaming console or device, a tablet, a laptop, a head-mounted device, a navigation device and a robotic device.

In an embodiment, the portable device further comprises a display. The method further comprises a step of generating a control signal configured to cause the images captured by the camera to be displayed on the display. The control signal may also be configured to cause virtual content to be displayed with the images.

The method enables an accurate and robust operation of a localization algorithm when the focus area of the camera needs to be changed, i.e. when a change of focus is required while at the same time preserving the quality of a user's MR/AR experience. The method therefore enables a change of focus on a portable device used for MR/AR applications.

Corresponding embodiments apply equally to the portable devices and the system described below.

An aspect of the invention provides a portable device comprising a camera and processing circuitry. The processing circuitry is configured to cause the portable device to perform localization of the portable device using a localization algorithm having as an input image data representing images captured by the camera. The processing circuitry is configured to cause the portable device to identify a current focus area of the camera. The processing circuitry is configured to cause the portable device to determine a desired focus area for the camera. The processing circuitry is configured to cause the portable device to determine that a change of focus is required when the desired focus area is different to the current focus area. The processing circuitry is configured to cause the portable device to generate a control signal configured to cause the focus of the camera change in respect of a new focus area.

In an embodiment, performing localization of the portable device includes identifying features from the image data, determining respective position information for the identified features, and associating an uncertainty with the identification of each said feature and its determined position information indicative of a respective level of trust.

In an embodiment, the processing circuitry is configured to cause the portable device to adjust the uncertainty associated with the identification of a feature and its determined position information as used by the localization algorithm to perform said localization of the portable device.

In an embodiment, the portable device comprises an inertial measurement unit, IMU. The processing circuitry is further configured to cause the portable device to perform localization of the portable device using the localization algorithm additionally having the IMU measurements as an input. The processing circuitry is further configured to cause the portable device to adjust the uncertainty associated with the identification of a feature and its determined position information by increasing the uncertainty at least to a value at which the localization algorithm preferentially uses the IMU measurements in said localization of the portable device. The uncertainty is at the increased value while the focus of the camera is changed.

An aspect of the invention provides a portable device comprising a camera, interface circuitry and processing circuitry. The processing circuitry is configured to cause the portable device to perform localization of the portable device using a localization algorithm having as an input image data representing images captured by the camera. The processing circuitry is configured to cause the portable device to identify a current focus area of the camera. The processing circuitry is configured to cause the portable device to determine a desired focus area for the camera. The processing circuitry is configured to cause the portable device to determine that the camera requires a change of focus when the desired focus area is different to the current focus area. The processing circuitry is configured to cause the portable device to generate a control signal configured to cause the focus of the camera to change in respect of a new focus area.

An aspect of the invention provides a system comprising a server and a portable device. The server comprises processing circuitry and interface circuitry. The portable device comprises a camera, processing circuitry and interface circuitry. The processing circuitry of the server and the processing circuitry of the portable device are together configured to: perform localization of the portable device using a localization algorithm having as an input image data representing images captured by the camera; identify a current focus area of the camera; determine a desired focus area for the camera; determine that a change of focus is required when the desired focus area is different to the current focus area; and generate a control signal configured to cause the focus of the camera to change in respect of a new focus area.

An aspect of the invention provides a computer program, comprising instructions which, when executed on at least one processor, cause the at least one processor to carry out the above method of controlling a portable device.

An aspect of the invention provides carrier conveying the above computer program, wherein the carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
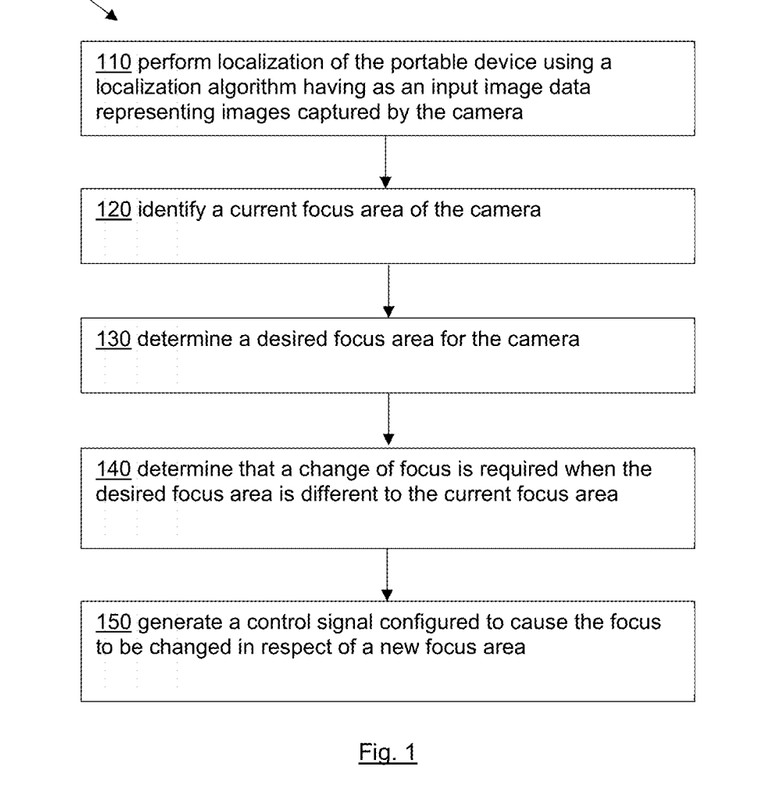
FIGS. 1, 3 and 4 are flowcharts illustrating embodiments of a method disclosed herein.

Referring to FIG. 1, an embodiment of the invention provides a method 100 of controlling a portable device comprising a camera.

The method comprises:
performing 110 localization of the portable device using a localization algorithm having as an input image data representing images captured by the camera;
identifying 120 a current focus area of the camera;
determining 130 a desired focus area for the camera;
determining 140 that a change of focus is required when the desired focus area is different to the current focus area; and generating 150 a control signal configured to cause the change of focus area.

Image data may be output by, or derived from, data output by the camera. The image data may comprise image frames, each image frame comprising pixel intensity data at a point in time for the pixels of an image sensor in the camera. A focus area comprises one or more areas within an image in which the image content has the highest level of sharpness. Out-of-focus areas are the complementary areas to focus areas in an image. The process of moving the focal plane of the camera forward and backward is called focusing, focus adaptation or a change of focus.

A change of focus may for example be performed using an autofocus algorithm, implemented for example as a component of the camera, when supplied with a required focus area. The autofocus algorithm determines and applies a focal setting in the camera on the basis of objects it identifies within the supplied focus area. Alternatively, a change of focus may be performed for the supplied focus area by software-implemented independently of the camera but in communication with an interface, e.g. an application programmers' interface (API) to the camera to change a focal setting of the camera.

The portable device may for example be any one of a computing device, a smart phone, a portable phone, a cell phone, a wireless device, a wireless camera, a gaming console or device, a tablet, a laptop, a head-mounted device, a navigation device and a robotic device.

In an embodiment, the portable device comprises a display and the method comprises generating a control signal configured to cause the images captured by the camera to be displayed on the display. The control signal may also be configured to cause virtual content to be displayed with the images.

The desired focus area may be any of: an area centred on a position within an image displayed on a display of the portable device on which a user's eyes are focused; an area centred on a position within an image displayed on a display of the portable device on which a user has made a tap gesture; an area defined by a position and dimensions of virtual content displayed on a display of the portable device with the images captured by the camera; an area defined by a position and dimensions of a fiducial marker applied to the image data; and a specified region of interest. In the case of a smartphone, for example, a desired focus area is typically defined by the user, for example by tapping on the smartphone screen and defining the area. A desired focus area may also be defined by other means, for example by tracking a user's eye gaze and defining the area on the screen, i.e. within the image, that the user is looking at as the desired focus area.

In an embodiment, the localization algorithm is a localization and mapping algorithm, which may be a simultaneous localization and mapping, SLAM, algorithm.

Alternatively, the localization algorithm may be a structure from motion algorithm. Either option is applicable to solving the problem of building a 3D model of the environment and localizing the portable device within the environment.

The localization algorithm may be a direct localization algorithm, identifying and tracking movement of features comprising luminance/chrominance patterns. Alternatively, the localization algorithm may be an in-direct localization algorithm, identifying and tracking movement of features comprising geometric patterns and features such as corners and edges, or more sophisticated feature descriptors such as SIFT, ORB, and FAST, as described, for example, in Ra'ul Mur-Artal et al "ORB-SLAM: a Versatile and Accurate Monocular SLAM System", IEEE Transactions on Robotics, Volume: 31, Issue: 5, October 2015, pages 1147-1163, "Feature Choice" and "ORB Extraction".

In an embodiment, performing localization of the portable device includes identifying features from the image data and determining respective positions of the identified features. An uncertainty is associated with the identification of a feature and with its determined position, indicative of a respective level of trust. The level of uncertainty varies according to the image content in image data received from the camera and image quality of selected image content. An uncertainty indicative of a level of trust in the identified features and their determined position may, for example, be calculated based on the technical characteristics of the camera or based upon an educated guess.

In an embodiment, the method comprises adjusting the uncertainty associated with the position of selected features determined by the localization algorithm, as used by the localization algorithm to determine a position/orientation of the portable device.

In one embodiment, adjusting the uncertainty associated with the position of selected features comprises: increasing the uncertainty associated with features lying, or predicted to lie, outside the new focus area; changing the focus of the camera to the new focus area; and reducing the uncertainty associated with features lying, or predicted to lie, inside the new focus area after the change of focus of the camera is completed.

Increasing or decreasing the uncertainty is a way to tell the localization algorithm which of two sensors, e.g. the camera and an IMU, it should trust more when determining the position/orientation of the portable device, in case an IMU is also available. If, in an embodiment, we assume that there is no inertial measurement unit, IMU, and we only have the camera, we don't need to adjust the uncertainty. We temporarily stop operation of the localization algorithm for as long as it takes to change the focus of the camera in respect of the new focus area. This will achieve the best results if the device is stationary. By stopping the algorithm, we do not supply low quality images to the algorithm which may reduce the ability of the algorithm to identify features and determine their position accurately, saving computation effort.

In another embodiment, adjusting the uncertainty associated with selected features comprises increasing the uncertainty to a value indicative of a lack of trust while the focus of the camera is changed. This causes the localization algorithm to stop running while the focus of the camera is changed.

In an embodiment, the portable device comprises both a camera and an IMU having an accelerometer and a gyroscope. The accelerometer is configured to measure linear acceleration of the portable device in each of three dimensions (x,y,z) and the gyroscope is configured to measure angular velocity of the portable device about each of three orthogonal axes (u,v,w) which may be aligned with the axes (x,y,z), or differently oriented by a known amount. These measurements may be used to estimate a change in the position and orientation of the device over a time period, for example over an image frame period from capture of a first to capture of a second successive image by the camera.

The localization algorithm may additionally receive the 3D linear acceleration and 3D rotational velocity measurements, the "IMU measurements", as an input. Adjusting the uncertainty associated with selected said features here comprises increasing the uncertainty to a value at which the localization algorithm preferentially uses the IMU measurements. The uncertainty remains at the increased value until the focus of the camera has been changed.

Figure 2:
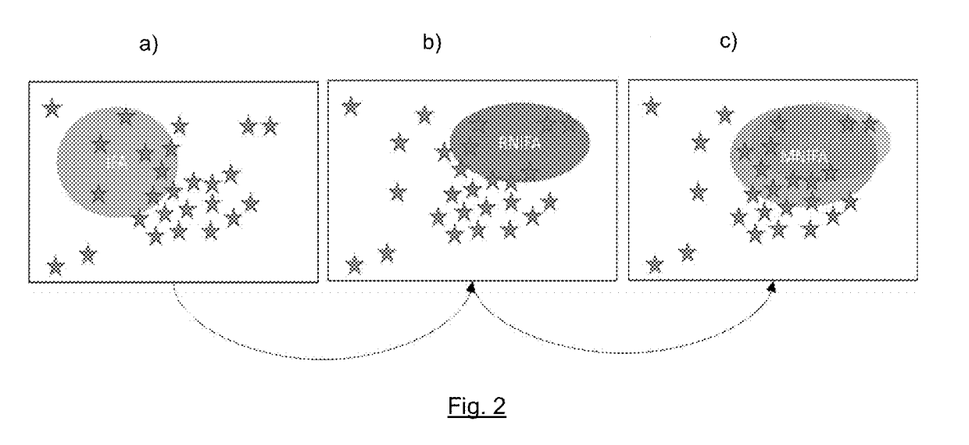
FIG. 2 is a schematic representation of an image showing focus areas.

Referring to FIG. 2, in an embodiment, the method comprises determining, for example by prediction, the number of features (illustrated as stars in FIG. 2) likely to be identified within the desired focus area, RNIFA. To be counted, an identified feature must have at least a minimum level of quality. The camera has a current focus area, IFA, as illustrated in FIG. 2 a). A desired focus area, RNIFA, is then identified, as illustrated in FIG. 2 b). The desired focus area may be defined in any of the ways described above. The desired focus area is selected as the new focus area if the number of features identified, or predicted to be identifiable within the desired focus area is at least equal to a specified minimum number of features. To be counted, an identified feature must have at least the minimum level of quality.

Referring to FIG. 2 c), an area different to the desired focus area is selected as the new focus area if the number of features identified, or predicted to be identifiable within the desired focus area is less than the specified minimum number of features. Where the localization algorithm has generated a map of an environment in which the portable device is operating, the map representing features and their relative positions, the algorithm is able, given the current focus area and the map, to predict which of the already-identified features are likely to lie within the new focus area. The algorithm achieves this for example by using a recent history of position and orientation of the portable device to determine a current direction of motion and changing orientation of the device. The algorithm may use the determined current motion of the device to predict the position and orientation of the device a short time into the future, for example one or more frame periods into the future, and so determine which of the already identified and mapped features are likely to lie within the new focus area at that time.

The area, MNIFA, chosen as the new focus area is an area closest to the desired focus area for which the number of features within that area is predicted to be at least equal to the specified minimum number of features. Closeness is determined, for example, by determining the relative positions, within an image captured by the camera, or in real-world coordinates, of a centroid of the new focus area and a centroid of the desired focus area.

As illustrated in FIG. 2 c), the area chosen as the new focus area may be an area shifted horizontally or vertically from the desired focus area. The new focus area may be an area of the same size as the desired focus area that is shifted from the desired focus area by the smallest distance required for the number of features identified, or predicted to be identifiable, within that area to be at least equal to the specified minimum number of features.

Alternatively, the new focus area may be a larger area that includes the desired focus area.

In some cases, it may be that the desired focus area is far from the current focus area. That will mean that there may be very few of the previously identified and mapped features near the desired focus area. If the device is moving, the algorithm may be discovering new features, estimating their position and adding them to the map. In such a case, it may be difficult for the algorithm to predict how many identifiable features are likely to lie within a new focus area until the map has been extended. Several iterations of the algorithm may be required before the algorithm is able to select a new focus area that contains at least the minimum number of features and is sufficiently close to the desired focus area to satisfy both the localization algorithm and the user. At least some of the good features (those of at least the minimum quality level) are likely to be near the current focus area. One option is therefore is to choose, as the new focus area, a larger area that includes the desired focus area and at least a part of the current focus area. This is sufficient for a first iteration, but after this new large focus area is used, features near the desired focus will be identified and their quality, or the quality of previously identified features within the new focus area, will start to improve (because they are now in focus). The acts of changing the focus of the camera and selecting a new focus area are therefore repeated until the new focus area converges with an area as close as possible to the desired focus area. That is to say, the method performs a gradual adjustment of the new focus area until it converges with an area as close as possible to the desired focus area. This not only enables the localization algorithm to perform with an acceptable level of accuracy, but also enables a user to see those objects that they want to see with an acceptable clarity of focus.

Converging on an area close to the desired focus area may avoid a worst-case scenario where the desired focus area doesn't contain a sufficient number of features to enable position/orientation of the device to be determined with sufficient accuracy. In this case, the iterative procedure would never converge to the desired focus area and a compromise focus area results, balancing the needs of the localization algorithm with the needs of a user.

In an embodiment, the acts of selecting a new focus area and thereby of changing the focus of the camera are repeated until the new focus area converges with the desired focus area.

In an embodiment, a deblurring algorithm is applied if the portable device is stationary.

In an embodiment, if a time required for the camera to adjust focus to a new focus area is less than a threshold time period, adjusting the uncertainty associated with the position of selected features comprises reducing the uncertainty associated with the position of features lying within, or predicted to lie within the new focus area.

In an embodiment, if the change of focus can be performed substantially instantaneously by the camera, adjusting the uncertainty associated with the position of selected features comprises reducing the uncertainty associated with the position of features lying within, or predicted to lie within the new focus area.

In an embodiment, if the portable device is determined not to be stationary the method comprises delaying a change of focus of the camera based upon the new focus area until the portable device is determined to be stationary.

Figure 3:
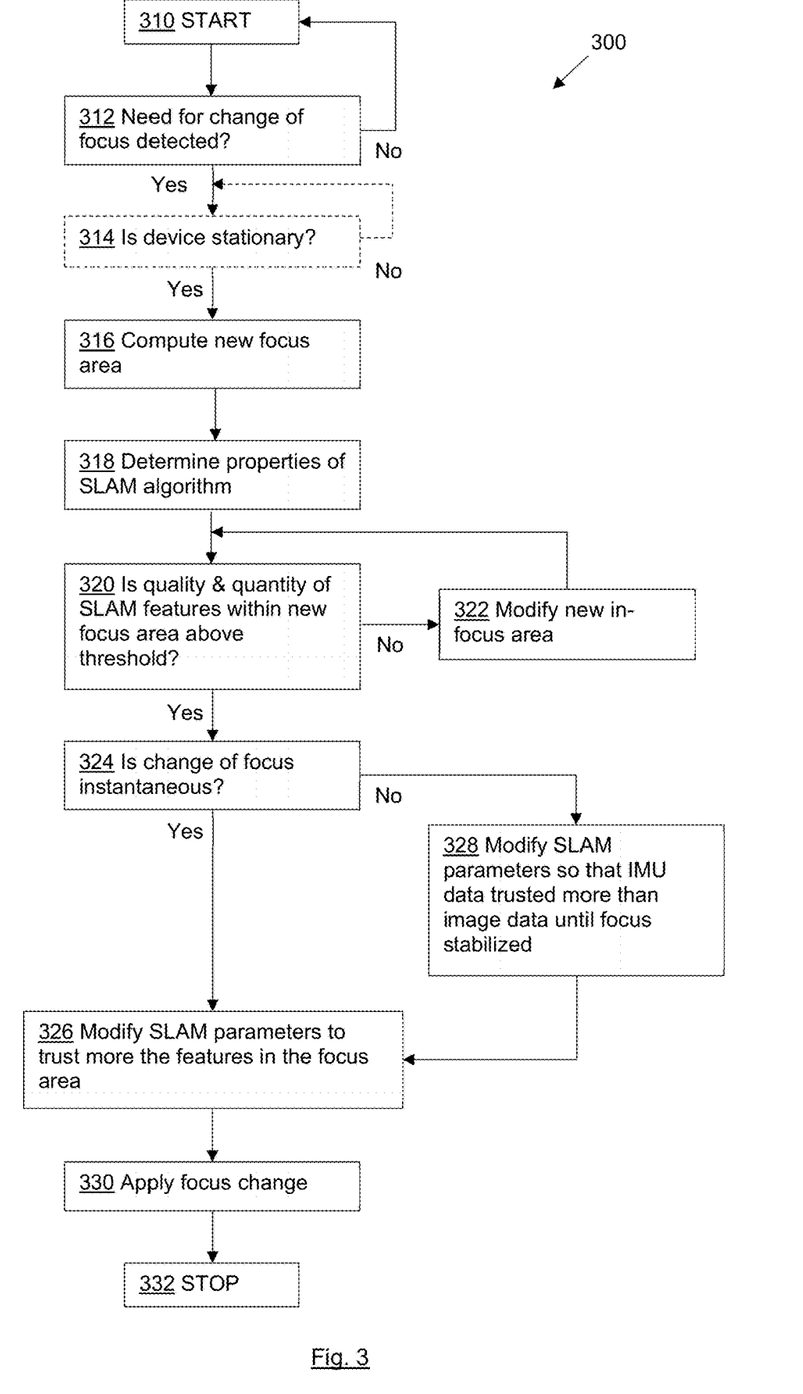
Figure 4:
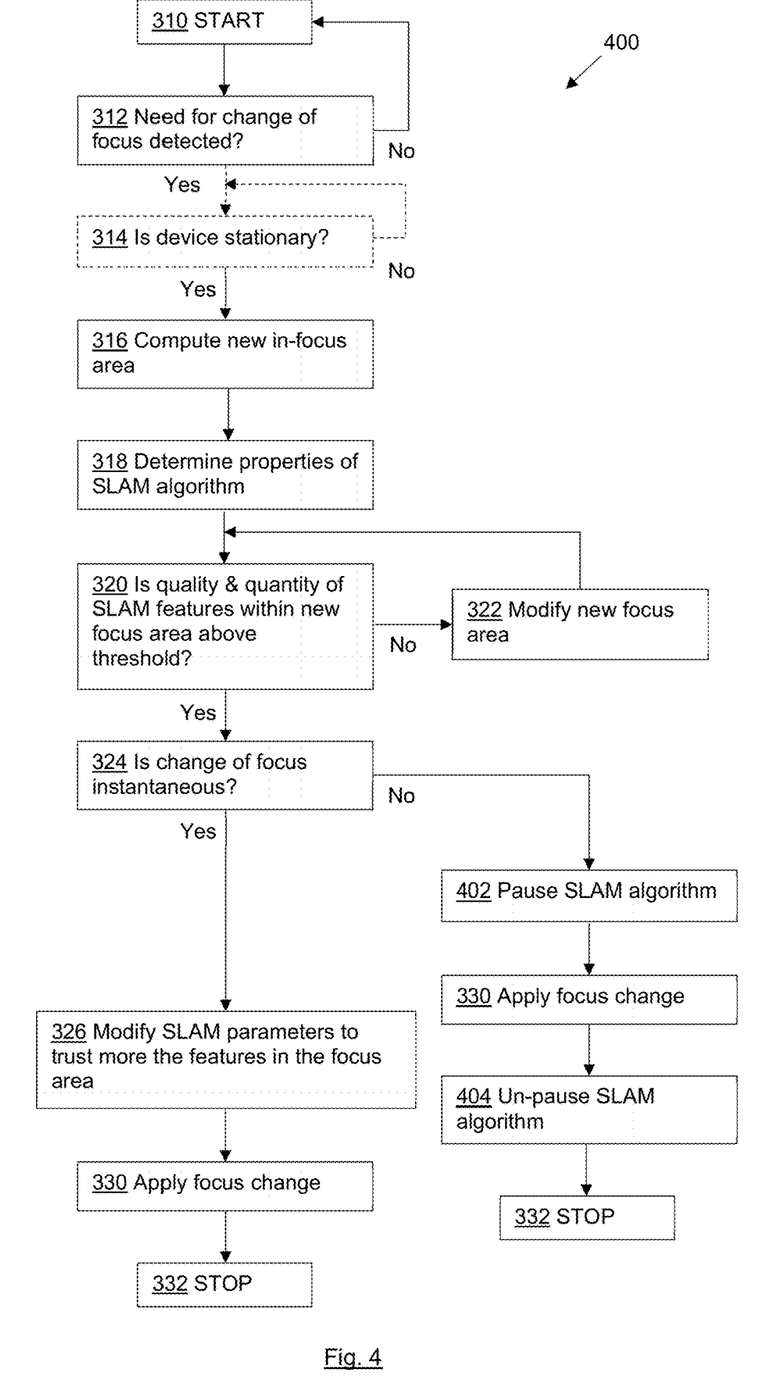
Figure 5:
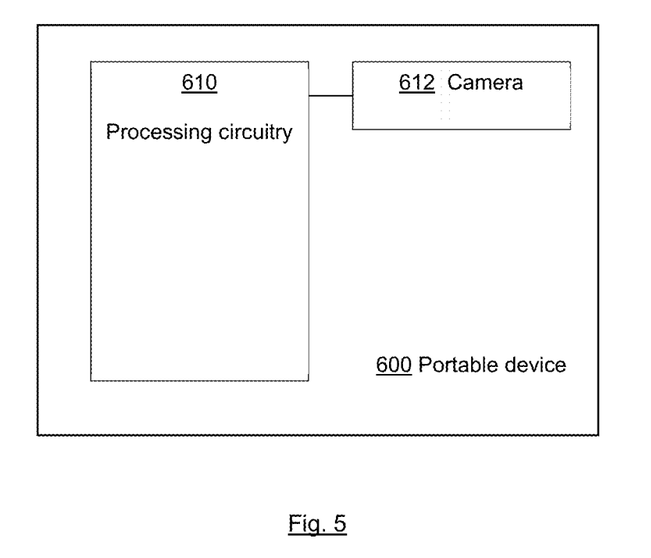
FIGS. 5 to 7 are block diagrams illustrating portable devices according to embodiments of the invention.

Referring to FIGS. 3 to 5, embodiments of the invention comprise methods 300, 400 of controlling a portable device. In these embodiments, the portable device is a smartphone comprising a camera and an inertial measurement unit, IMU, and the localization algorithm is a simultaneous localization and mapping, SLAM, algorithm. The portable device uses position information output by the SLAM algorithm in displaying virtual content combined with the images captured by the camera, thereby to present a mixed reality, MR, or augmented reality, AR, visualisation to a user.

The methods 300, 400 comprise:
  a. Determine 314 if device is stationary by analyzing its motion properties. This is optional (indicated by dashed lines in FIGS. 3 and 4).
  b. Detect 312 need for change of focus and identify the current focus area and a desired focus area.
  c. Determine 318 properties of SLAM algorithm.

d. Determine 316 new focus area and adjust 326 the SLAM algorithm.

Each of these acts will now be described in more detail.

Act a) is optional. Stationarity is the best-case scenario, allowing the method to rely entirely on IMU measurements during a change of focus of the camera. However, the method can be implemented if the device is not stationary. Stationarity of the mobile device can be determined by the following procedures.

In one embodiment, the SLAM algorithm is visual, which means the position and orientation of the device are estimated based entirely on the images captured by the camera. If the difference in position and orientation of the device for the last n frames stays below a pre-set threshold value, then the device is considered to be stationary.

In another embodiment, the SLAM algorithm is visual-inertial, which means the position and orientation of the device are estimated based on visual features extracted for the images captured by the camera, on IMU measurements, or on both. In the case of IMU measurements, known algorithms may be used to determine whether the device is stationary, as described, for example, in I. Skog et al, "Zero-velocity detection—An algorithm evaluation", IEEE Transactions on Biomedical Engineering, Vo. 57, Issue 11, November 2010, pages 2657-2666. When both visual features and IMU measurements are used, the position and orientation of the device estimated by the SLAM algorithm becomes significantly more accurate. If the difference in position and orientation of the device for the last n time steps stays below a pre-set threshold value, then the device is considered to be stationary.

The outcome of this procedure is a binary variable, which is true when the device is stationary, and false in case the device is moving/rotating.

Referring to b), above, the need for focus change is detected 312 when an update to the focus area is desired.

An update of the focus area may be predicted based on any of the following:

An area of a given desired size, centred where the user's eyes are focused

An area of a given desired size on the smartphone's screen where the user tapped with their fingers to specify their desired focus area An area defined by the position and dimensions of the virtual content which the user is currently visualizing in the MR/AR application An area defined by the position and dimensions of a visual fiducial marker with known size and pattern, for example a tag which is the positional anchor or reference for virtual content, or a tag which is used for positioning of the device to a certain position/orientation in the real world.

The need for focus change is true whenever the focus area computed on the basis of the above is different from the current focus area.

Referring to c), above, properties of the SLAM algorithm include a current set of the features that have been identified and that are being tracked by the SLAM algorithm:

$$N[k] = N_{in}[k] + N_{out}[k],$$

where $N[k]$ is the total number of features identified and tracked by the SLAM algorithm at the kth frame, and $N_{in}[k]$ and $N_{out}[k]$ denote the features identified as lying inside and outside the focus area, respectively, at the kth frame. $N_{min}$ is a specified minimum number of tracked features that should lie in the focus area to ensure that the SLAM algorithm is accurate and robust.

Depending on the application, $N_{min}$ can be tuned accordingly. When $N_{in}[k] \, N_{min}$, the SLAM algorithm is considered to be robust enough to deliver accurate estimates of the smartphone's position and orientation, otherwise the focus area needs to be modified to a new focus area which achieves $N_{in}[k] \geq N_{min}$.

Let us also define $\tilde{N}_{in}[k+1]$ as the predicted number of features lying inside the desired focus area, from a), and $\tilde{N}_{out}[k+1]$ the number of features predicted as lying outside the focus area.

In one embodiment, the following information may be obtained from the SLAM algorithm running in the background: the total number of tracked features $N[k]$; the number of features inside the focus area $N_{in}[k]$; and the number of features outside the focus area $N_{out}[k]$. This information is commonly available in the SLAM algorithm.

The features must have a confidence level above a minimum threshold. For example, only features that are classified as having a high confidence level (i.e. high quality, robust features) are counted. Naturally, features within the focus area $N_{in}[k]$ tend to have a higher confidence level than the ones outside it, since features inside the focus area will be sharper and less blurry. An example of methods that perform the selection of "good" features for SLAM can be found in G. Zhang and P. Vela, "Good Features to Track for Visual SLAM", 10.1109/CVPR.2015.7298743.

The predicted number of features $\tilde{N}_{in}[k-1]$ lying inside the new focus area and the predicted number of features $\tilde{N}_{out}[k-1]$ lying outside the focus area are determined, as in the two previous embodiments.

Referring to c), above, two cases are considered: the change of focus is instantaneous, or substantially instantaneous; and the change of focus is not instantaneous 324. We note that in current state of the art smartphones the change of focus may take up to thousands of milliseconds (e.g. 1000 ms on an iPhone 8). Such a rate of change would be considered non-instantaneous. However, in future smartphones the change of focus may occur with a rate that is instantaneous, or with a delay that is lower than the image capturing period (i.e. frame period) of the camera, a rate of change referred to herein as "substantially" instantaneous; for example, a delay of less than 16 ms for a camera operating with a frame rate of 60 Hz.

The reason to consider these two cases separately is that in the non-instantaneous case, a sequence of blurry images is fed to the SLAM algorithm which greatly impacts its performance, so specific embodiments are provided to mitigate this issue. On the other hand, these embodiments no longer apply for the case in which the change of focus is instantaneous or substantially instantaneous.

Considering first the case where the change of focus is not instantaneous.

If the device is not stationary (inferred by a) 314, above), the change of focus may be postponed until the device becomes stationary in order to obtain the best performance of the algorithm.

In an embodiment, the uncertainty associated with the position of the identified features is increased 328 while the change of focus is taking place, as described above. This forces the SLAM algorithm to rely more on the IMU measurements (or other positioning sensors available in the device), than the image data until the focus change is settled. Once the focus is settled, all the uncertainties of the SLAM algorithm are restored to their previous values. We do this when the device is stationary so that the effect of the change of focus on the performance of the SLAM algorithm is minimized. During the change of focus the images captured by the camera will be blurry, and that is the reason the SLAM algorithm should rely more on the IMU during that time. Even though the device is stationary, there could still be motions occurring while the focus is changing, which could last up to 1 second. Therefore, it is beneficial to trust the IMU entirely during these moments when the features to be relied upon by the SLAM algorithm in images captured by the camera are blurry. In this embodiment it is beneficial that the device is stationary.

In an embodiment, operation of the SLAM algorithm is paused 402 (not allowed to perform updates) while a change of focus is performed 330, and its operation is un-paused 404 (allowed to perform updates) when the change of focus is concluded. In this way, the SLAM algorithm makes no use of the sequence of blurry images during the change of focus, and so the position/orientation of the device and any map generated by the SLAM algorithm will remain fixed during the change of focus. Otherwise, it is likely that the sequence of blurry images will degrade the estimation of device position/orientation and mapping during the change of focus. For this embodiment, if the device is truly stationary, the estimated position/orientation of the device when operation of the SLAM algorithm is un-paused is the same or as close as possible to the position/orientation estimated before operation of the SLAM algorithm was paused. In this way, the estimated position/orientation of the device will remain constant during the change of focus and the user will not notice any jumps or glitches in the displayed content. In this embodiment it is beneficial that the device is stationary. To the extent that the device moves during the change of focus in this embodiment, the determined position/orientation of the device before and after the change of focus will be more or less different, causing some level of displacement in displayed content when operation of the SLAM algorithm restarts.

In an embodiment, if the number of features predicted to lie in the new focus area 320 is below a threshold ($\tilde{N}_{in}[k+1]<N_{min}$) before the previous embodiment is applied, a new focus area is computed 322 which guarantees $\tilde{N}_{in}[k+1] \geq N_{min}$. The new focus area is the area which is the area closest to the one computed in b), above, which guarantees that the predicted number of features lying inside it is above a threshold ($\tilde{N}_{in}[k+1] \geq N_{min}$).

These acts are repeated until the error/distance between the current focus and the desired focus area, determined for example by the relative position of centroids determined for the new and desired focus areas, is minimized and the $\tilde{N}_{in}[k-1] \geq N_{min}$ condition is met.

However, in another embodiment, if the number of features predicted to lie in the new focus area 320 is below a threshold ($\tilde{N}_{in}[k+1]<N_{min}$), it may be that the device is heading towards a featureless region in which there is a risk that the localization algorithm will lose track of the motion of the device if it continues to rely only upon image data from the camera for tracking purposes. If such a scenario is detected, a warning message may be triggered to indicate that a change of direction for the device is required. Alternatively, the algorithm may be operated for a period of time to rely upon the measurements by an IMU to track the motion of the device until such time as a sufficient number of features are once again identified in image data from the camera.

In an embodiment, if the number of features predicted to lie in the desired focus area is above a threshold ($\tilde{N}_{in}[k+1] \geq N_{min}$), then the desired focus area identified in b), above, is used as the new focus area and the uncertainty associated with the determined position of the $\tilde{N}_{out}[k+1]$ features predicted as lying outside the new focus area is increased 326. The higher the uncertainty the lower the confidence of the determined position for a feature. This way the SLAM algorithm will estimate the position and orientation of the device and world locations relying mostly on the features within the new focus area, which is the area with the highest image quality.

The identification of features by the SLAM algorithm, and their estimated position, comes with some uncertainty. The SLAM algorithm is a filter that tries to estimate the position and orientation of the device by tracking identified features as well as generating a map that surrounds the device. The data obtained from the IMU are quite straightforward; 3D (x,y,z) linear acceleration from the embedded accelerometer and 3D (u,v,w) rotational velocity from the embedded gyroscope, where the axes (x,y,z) of the accelerometer may be aligned with the axes of rotation (u,v,w) for the gyroscope, or rotationally displaced by a known amount. When it comes to the images captured by the camera, we are trying to extract information with respect to features lying in the captured image. Every time the algorithm estimates the position and orientation of the device, as well as objects represented in the map, it takes into consideration the previous state of the system, which is the previous position/orientation of the device and the available constructed map from the previous state. The extracted features come with an uncertainty as to their position. As time evolves and the device is moving in areas that always have sufficient number of features to be extracted, the SLAM algorithm is able both to create a map and localize the device within that map. In order for the SLAM algorithm to work, an uncertainty needs to be assigned to each state. Consider it as if the data received from the camera and the IMU always come with some noise. This can be done based on the technical characteristics of the camera and the IMU, or based upon an educated guess. So, we have an uncertainty associated with the visual measurements, and an uncertainty associated with the IMU measurements. The uncertainty associated with the visual measurements, in particular, is varied in the ways described above when the need for a change of focus occurs.

In an embodiment, if the number of features lying or predicted to lie in the new focus area 320 is above a threshold ($\tilde{N}_{in}[k+1] \geq N_{min}$), deblurring is applied to the images provided to the SLAM algorithm where the deblurring is only applied to the new focus area. In this way we perform an efficient application of deblurring algorithms to provide images with a clear focus area to the SLAM algorithm and hence allow the SLAM to perform in an accurate and robust manner. The reason for applying this in the case that the device is stationary is that the deblurring parameters to be applied to all the images during the duration of the focus change can be kept constant (i.e. deblurring parameters are computed only once) which is very efficient.

In the case where the change of focus is instantaneous or substantially instantaneous, the following embodiment may be applied.

In an embodiment, if the number of features lying or predicted to lie in the new focus area 320 is below a threshold ($\tilde{N}_{in}[k+1]<N_{min}$), then a modification 322 of the new focus area is performed so that the new focus area guarantees $\tilde{N}_{in}[k+1]>N_{min}$. The new focus area selected is that which is the closest area to the desired focus area computed in b), above, while guaranteeing that the number of features lying inside it is above a threshold ($\tilde{N}_{in}[k+1] \geq N_{min}$). For example, the new focus area is a larger area that includes the desired focus area, while guaranteeing the desired condition. In another case, the new focus area is larger or the same size as the desired focus area but shifted horizontally or vertically, or both, in order to guarantee the desired condition. As above, closeness is determined by the relative positions of the centroids of the new and desired focus areas and the aim here is to minimise the distance between the centroids. This way we perform a trade-off between the best area from the user MR/AR experience point of view, and the area which allows the SLAM to perform in an accurate and robust manner.

However, in another embodiment, as above, if the number of features predicted to lie in the new focus area 320 is below a threshold ($\tilde{N}_{in}[k+1] < N_{min}$), it may be that the device is heading towards a featureless region in which there is a risk that the localization algorithm will lose track of the motion of the device if it continues to rely only upon image data from the camera for tracking purposes. If such a scenario is detected, a warning message may be triggered to indicate that a change of direction for the device is required. Alternatively, the algorithm may be operated for a period of time to rely upon the measurements by an IMU to track the motion of the device until such time as a sufficient number of features are once again identified in image data from the camera.

In another embodiment, if the number of features lying or predicted to lie in the new focus area 320 is above a threshold ($\tilde{N}_{in}[k+1] \geq N_{min}$), then the desired focus area computed in b), above, is used as the new focus area and the uncertainty of the SLAM algorithm associated with the $\tilde{N}_{out}[k+1]$ features is increased. This way the SLAM algorithm will estimate the position and orientation of the device and world locations relying mostly on the features within the new focus area, which is the area with the highest image quality.

The method 300, 400 overcomes the problem that the position of a smartphone and of virtual content being displayed on it can drift by several centimetres when the camera performs a change of focus. This issue occurs because the MR SDKs ARKit and ARCore do not consider the change of focus in their SLAM implementation. In particular, it is noticeable that during a change of focus, which may take up to 1000 ms, a long sequence of blurry images is fed into the SLAM algorithm with the result that the determined position/orientation of the smartphone in World coordinates and hence the position/orientation of the displayed virtual content changes in comparison with the actual real-world position/orientation of the device, which is very undesirable from an MR/AR experience point of view. Moreover, it is noticeable that after the focus settles in respect of a new focus area, the positions/orientations of the device and mapped objects do not recover to the previously known positions/orientations. By adjusting the uncertainty applied to positions/orientations of identified features determined by the SLAM algorithm, as described above, the method of the present invention may overcome or mitigate these problems.

The method disclosed herein controls when a change of focus can take place, determines the new focus area for the camera and adjusts the parameters of the Simultaneous Localization and Mapping (SLAM) algorithm, to balance a suitable MR/AR experience with an accurate and robust performance of the device's localization and mapping, which is essential in an MR/AR application.

The method disclosed herein is for a portable device having a single camera which is used for both visualization purposes and for localization and mapping. By controlling the focus area, the method ensures that a sufficient number of high-quality features lie inside the new focus area. In this way, the accuracy and robustness of the SLAM algorithm is maintained, making the anchoring of virtual content more stable and consistent.

The change of focus on current state of the art smartphones is not instantaneous which greatly impacts the localization and mapping performance. The method handles this by considering the device motion and controlling the operation of the SLAM algorithm during a change of focus.

The method guarantees an accurate and robust operation of the SLAM algorithm in the occasions where the focus area needs to be changed (i.e. focus change) while at the same time preserving the quality of a user's MR/AR experience. This method does not require any extra hardware besides a camera and IMU, which are components already available in all smartphones. The method does not require computationally heavy operations, as the change of focus, SLAM parameters and the SLAM operation can be computed using simple rules.

Referring to FIG. 5, an embodiment of the invention provides a portable device 600 comprising a camera 612 and processing circuitry 610. The processing circuitry is configured to cause the portable device to perform the method of controlling a portable device, as described above.

Figure 6:
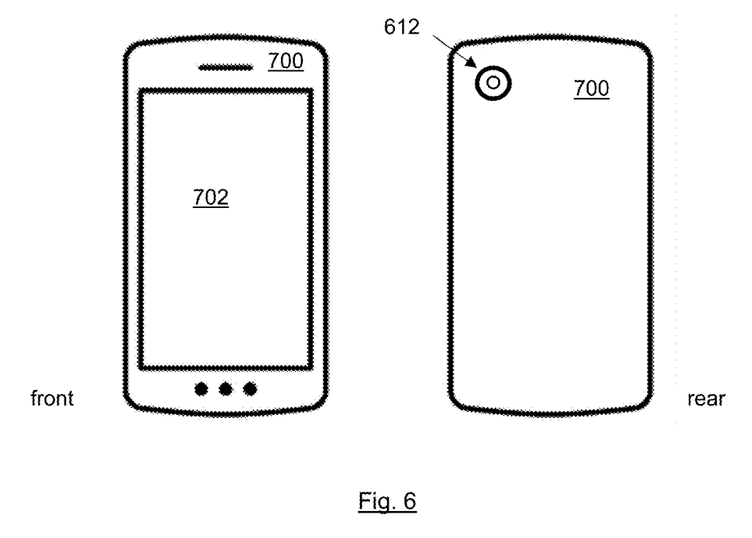
Figure 7:
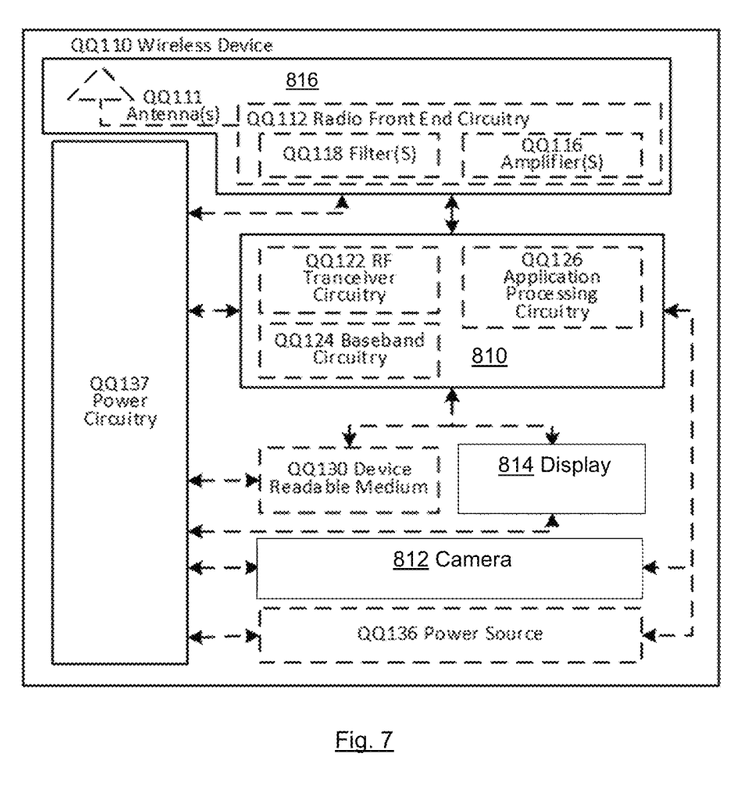

The portable device 600 may be any one of a computing device, a smart phone 700, as illustrated in FIG. 6, a wireless device QQ110, as illustrated in FIG. 7, a portable phone, a cell phone, a wireless camera, a gaming console or device, a tablet, a laptop, a head-mounted device, a navigation device and a robotic device.

In an embodiment, the portable device is a smart phone 700 and comprises a display 702 and an inertial measurement unit, IMU. The camera 612 is a rear-facing camera. The processing circuitry 610 is configured to generate a control signal configured to cause the images captured by the camera to be displayed on the display. The control signal may also be configured to cause virtual content to be displayed with the images.

The smart phone 700 comprises an inertial measurement unit, IMU. The processing circuitry 610 is configured to cause the portable device to perform localization of the portable device using the localization algorithm additionally having the IMU measurements as an input.

Referring to FIG. 7, an embodiment of the invention provides a portable device QQ110 comprising a camera 812, a display 814, interface circuitry 816 and processing circuitry 810. The processing circuitry is configured to cause the portable device to perform localization of the portable device using a localization algorithm having as an input image data for images captured by the camera. The processing circuitry is configured to cause the portable device to identify a current focus area of the camera. The processing circuitry is configured to cause the portable device to determine a desired focus area for the camera. The processing circuitry is configured to cause the portable device to determine that the camera requires a change of focus when the desired focus area is different to the current focus area. The processing circuitry is configured to cause the portable device to generate a control signal configured to cause the focus of the camera to change to a new focus area.

The portable device may be a wireless device, WD. The term WD refers to a device capable, configured, arranged and/or operable to communicate wirelessly with network nodes and/or other wireless devices. Unless otherwise noted, the term WD may be used interchangeably herein with user equipment, UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a computing device, a smart phone 700 (as illustrated in FIG. 6), a portable phone, a cell phone, a wireless camera, a gaming console or device, a tablet, a laptop, a head-mounted device, a navigation device and a robotic device.

As illustrated, portable device QQ110 includes antenna QQ111, interface circuitry 816, processing circuitry 810, device readable medium QQ130, user interface equipment QQ132, camera 812, power source QQ136 and power circuitry QQ137. Portable device QQ110 may include multiple sets of one or more of the illustrated components for different wireless technologies supported by portable device QQ110, such as, for example, GSM, WCDMA, LTE, NR, Wi-Fi, WiMAX, or Bluetooth wireless technologies, just to mention a few. These wireless technologies may be integrated into the same or different chips or set of chips as other components within portable device QQ110.

Antenna QQ111 may include one or more antennas or antenna arrays, configured to send and/or receive wireless signals, and is connected to interface circuitry 816. In certain alternative embodiments, antenna QQ111 may be separate from portable device QQ110 and be connectable to portable device QQ110 through an interface or port. Antenna QQ111, interface circuitry 816, and/or processing circuitry 810 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface circuitry 816 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry 810 and is configured to condition signals communicated between antenna QQ111 and processing circuitry 810. Radio front end circuitry QQ112 may be coupled to or a part of antenna QQ111. In some embodiments, WD QQ110 may not include separate radio front end circuitry QQ112; rather, processing circuitry 810 may comprise radio front end circuitry and may be connected to antenna QQ111. Similarly, in some embodiments, some or all of RF transceiver circuitry QQ122 may be considered a part of interface circuitry 816. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry 810. In other embodiments, the interface may comprise different components and/or different combinations of components.

Processing circuitry 810 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other portable device QQ110 components, such as device readable medium QQ130, portable device QQ110 functionality. Such functionality may include providing any of the various wireless features or benefits discussed herein. For example, processing circuitry 810 may execute instructions stored in device readable medium QQ130 or in memory within processing circuitry 810 to provide the functionality disclosed herein.

As illustrated, processing circuitry 810 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry 810 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface circuitry 816. RF transceiver circuitry QQ122 may condition RF signals for processing circuitry 810.

In certain embodiments, some or all of the functionality described herein as being performed by a WD may be provided by processing circuitry 810 executing instructions stored on device readable medium QQ130, which in certain embodiments may be a computer-readable storage medium. In alternative embodiments, some or all of the functionality may be provided by processing circuitry 810 without executing instructions stored on a separate or discrete device readable storage medium, such as in a hard-wired manner. In any of those particular embodiments, whether executing instructions stored on a device readable storage medium or not, processing circuitry 810 can be configured to perform the described functionality. The benefits provided by such functionality are not limited to processing circuitry 810 alone or to other components of portable device QQ110 but are enjoyed by portable device QQ110 as a whole, and/or by end users and the wireless network generally.

Processing circuitry 810 may be configured to perform any determining, calculating, or similar operations (e.g., certain obtaining operations) described herein as being performed by a WD. These operations, as performed by processing circuitry 810, may include processing information obtained by processing circuitry 810 by, for example, converting the obtained information into other information, comparing the obtained information or converted information to information stored by portable device QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry 810. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 810. In some embodiments, processing circuitry 810 and device readable medium QQ130 may be considered to be integrated.

User interface equipment QQ132 may provide components that allow for a human user to interact with portable device QQ110. The user interface equipment comprises a display configured to display images captured by the camera and virtual content provided by the processing circuitry. Such interaction may be of many forms, such as visual, audial, tactile, etc. User interface equipment QQ132 may be operable to produce output to the user and to allow the user to provide input to portable device QQ110. The type of interaction may vary depending on the type of user interface equipment QQ132 installed in portable device QQ110. For example, if portable device QQ110 is a smart phone, the user interface equipment comprises a touch display. User interface equipment QQ132 is configured to allow input of information into portable device QQ110 and is connected to processing circuitry 810 to allow processing circuitry 810 to process the input information. User interface equipment QQ132 is also configured to allow output of information from WD QQ110, and to allow processing circuitry 810 to output information from portable device QQ110. User interface equipment QQ132 may include, for example, a speaker, a display, vibrating circuitry, a USB port, a headphone interface, or other output circuitry. Using one or more input and output interfaces, devices, and circuits of user interface equipment QQ132, portable device QQ110 may communicate with end users and/or the wireless network and allow them to benefit from the functionality described herein.

Camera 812 is operable to provide image data for images captured by the camera.

Power source QQ136 may, in some embodiments, be in the form of a battery or battery pack. Other types of power sources, such as an external power source (e.g., an electricity outlet), photovoltaic devices or power cells, may also be used. portable device QQ110 may comprise power circuitry QQ137 for delivering power from power source QQ136 to the various parts of portable device QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case portable device QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of portable device QQ110 to which power is supplied.

Figure 8:
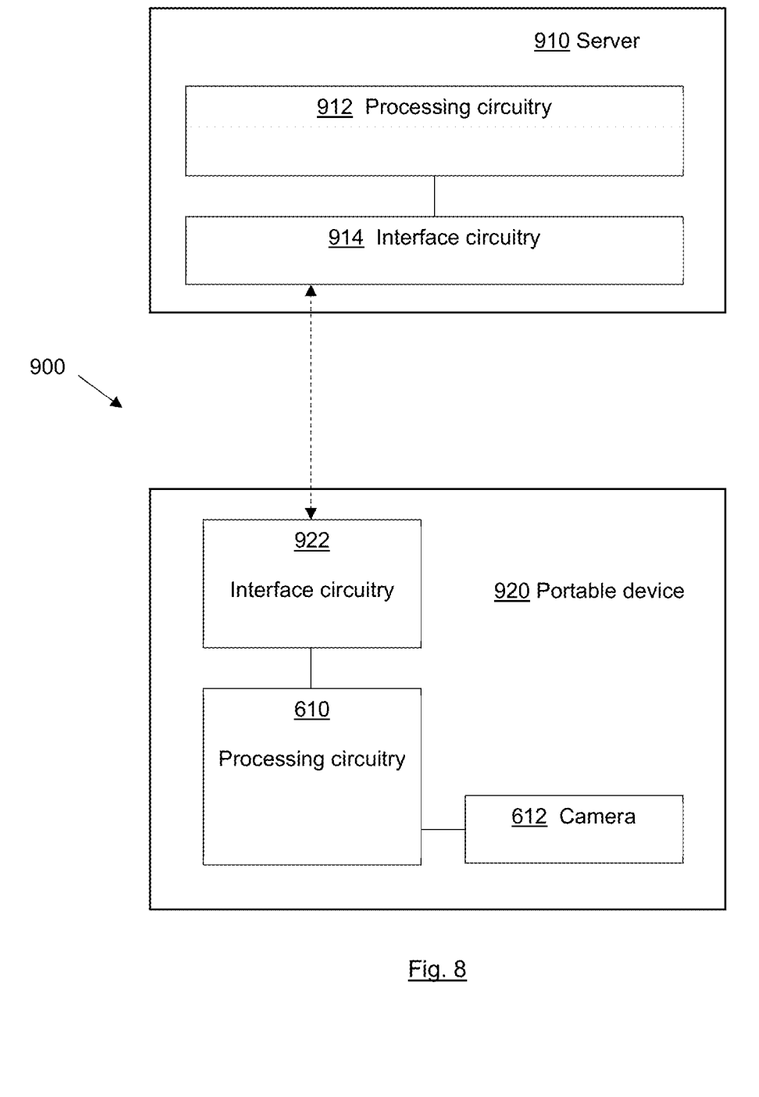
FIG. 8 is a block diagram illustrating a system according to an embodiment of the invention.

Referring to FIG. 8, an embodiment of the invention provides a system 900 comprising a server 910 and a portable device 920. The server comprises processing circuitry 912 and interface circuitry 914. The portable device comprises a camera 612, processing circuitry 610 and interface circuitry 922. The processing circuitry of the server and the processing circuitry of the portable device are together configured to: perform localization of the portable device using a localization algorithm having as an input image data for images captured by the camera; identify a current focus area of the camera; determine a desired focus area for the camera; determine that the camera requires a change of focus when the desired focus area is different to the current focus area; and generate a control signal configured to cause the focus of the camera to change to a new focus area.

The system 900 is configured to perform the method 100, 300, 400 of controlling a portable device described above. All of the method may be performed by the processing circuitry 912 of the server or some of the method may be performed by the processing circuitry of the server and the rest of the method by the processing circuitry 610 of the portable device.

An embodiment of the invention provides a computer program, comprising instructions which, when executed on at least one processor, cause the at least one processor to carry out the method of controlling a portable device.

An embodiment of the invention provides carrier containing the above computer program, wherein the carrier is one of an electronic signal, optical signal, radio signal, or computer readable storage medium.

The invention claimed is:

1. A method of controlling a portable device comprising a camera, the method comprising:
   performing localization of the portable device using a localization algorithm having as an input image data representing images captured by the camera, the localization algorithm performing localization of the portable device by identifying features within the input image data and determining respective positions of the identified features with respective levels of uncertainty;
   identifying a current focus area of the camera, the current focus area comprising a region within an image captured by the camera used to determine a current focus of the camera;
   determining a desired focus area for the camera, the desired focus area comprising a region within an image captured by the camera indicated as being desirable to use to determine a focus of the camera;
   determining that a change of focus is required when the desired focus area is different to the current focus area;
   responsive to determining that a change of focus is required:
      generating a control signal configured to cause the focus of the camera to change by using a new focus area that is different to the current focus area; and
      adjusting operation of the localization algorithm in respect of one or more features identified within the input image data by the localization algorithm according to whether the one or more features are determined to be lying within or outside of the new focus area or predicted to lie within or outside of the new focus area according to changes in the determined respective positions of the one or more features.

2. The method as claimed in claim 1, wherein adjusting operation of the localization algorithm further comprises adjusting levels of uncertainty used by the localization algorithm to identify features and their respective positions within the input image data based on whether the features lie within or outside of, or are predicted to lie within or outside of, the new focus area.

3. The method as claimed in claim 2, wherein adjusting the uncertainty comprises:
increasing the uncertainty associated with features lying, or predicted to lie, outside the new focus area; and
reducing the uncertainty of features lying, or predicted to lie, within the new focus area after the change of focus of the camera is completed.

4. The method as claimed in claim 3, comprising:
determining the number of features within the desired focus area having an associated confidence level above a minimum threshold; and
selecting the desired focus area as the new focus area when the number of features within the desired focus area having the associated confidence level above the minimum threshold is at least a specified minimum number of features.

5. The method as claimed in claim 2, wherein the portable device comprises an inertial measurement unit, IMU, the method comprising:
using measurements by the IMU in said localization of the portable device while the focus of the camera is being changed.

6. The method as claimed in claim 2, wherein adjusting the uncertainty comprises increasing the uncertainty to a value that causes the localization algorithm to stop running while the focus of the camera is being changed.

7. The method as claimed in claim 2, comprising:
determining a number of features within the desired focus area having an uncertainty of no more than a maximum level of uncertainty; and
selecting as the new focus area an area different to the desired focus area when the number of features within the desired focus area having no more than the maximum level of uncertainty is less than a specified minimum number of features,
wherein the new focus area is an area closest to the desired focus area for which the number of features within said area having no more than the maximum level of uncertainty is at least a specified minimum number of features.

8. The method as claimed in claim 7, wherein the new focus area is one of:
a first area that includes the desired focus area; and
a second area that is of the same size as the desired focus area that is shifted from the desired focus area by a smallest distance required for the number of features within said area having an associated confidence level above a minimum threshold to be at least to the specified minimum number of features.

9. The method as claimed in claim 7, wherein when the desired focus area is at a distance from the current focus area, the new focus area is a larger area that includes the desired focus area and at least part of the current focus area, and wherein the selecting of a new focus area and changing the focus of the camera are repeated to cause the new focus area to converges towards with the desired focus area.

10. The method as claimed in claim 2, comprising:
determining the number of features within the new focus area having an associated confidence level above a minimum threshold; and
applying a deblurring algorithm to the image data before identifying features from the image data when the number of features within the new focus area having an associated confidence level above a minimum threshold is at least a specified minimum number of features.

11. The method as claimed in claim 2, wherein, if a time required for the camera to change focus in respect of the new focus area is less than a threshold time period, adjusting the uncertainty associated with the identification of a feature and its determined position information comprises reducing the uncertainty associated with features lying, or predicted to lie, within the new focus area.

12. The method as claimed in claim 1, wherein the desired focus area is at least one of:
an area centered on a position within an image displayed on a display of the portable device on which it is determined that a user's eyes are focused;
an area centered on a position within an image displayed on a display of the portable device on which it is determined that a user has made a tap gesture;
an area defined by a position and dimensions of virtual content displayed on a display of the portable device with the images captured by the camera;
an area defined by a position and dimensions of a fiducial marker applied to the image data; and
a specified area.

13. A computer program, comprising instructions which, when executed on at least one processor, cause the at least one processor to carry out the method according to claim 1.

14. The method as claimed in claim 1, wherein the determined respective positions of the identified features are satisfactory if the levels of uncertainty of the respective positions are lower than a defined threshold.

15. A portable device comprising:
a camera;
interface circuitry; and
processing circuitry configured to cause the portable device to:
perform localization of the portable device using a localization algorithm having as an input image data representing images captured by the camera, the localization algorithm performing localization of the portable device by identifying features within the input image data and determining respective positions of the identified features with respective levels of uncertainty;
identify a current focus area of the camera, the current focus area comprising a region within an image captured by the camera used to determine a current focus of the camera;
determine a desired focus area for the camera, the desired focus area comprising a region within an image captured by the camera indicated as being desirable to use to determine a focus of the camera;
determine that a change of focus is required when the desired focus area is different to the current focus area;
responsive to determining that a change of focus is required:
generate a control signal configured to cause the focus of the camera to change by using a new focus area that is different to the current focus area; and
adjusting operation of the localization algorithm in respect of one or more features identified within the input image data by the localization algorithm according to whether the one or more features are determined to be lying within or outside of the new focus area or predicted to lie within or outside of the new focus area according to changes in the determined respective positions of the one or more features.

* * * * *